Oct. 28, 1924.
H. R. STANDLEE
SWAB
Filed Aug. 17, 1922
1,513,649
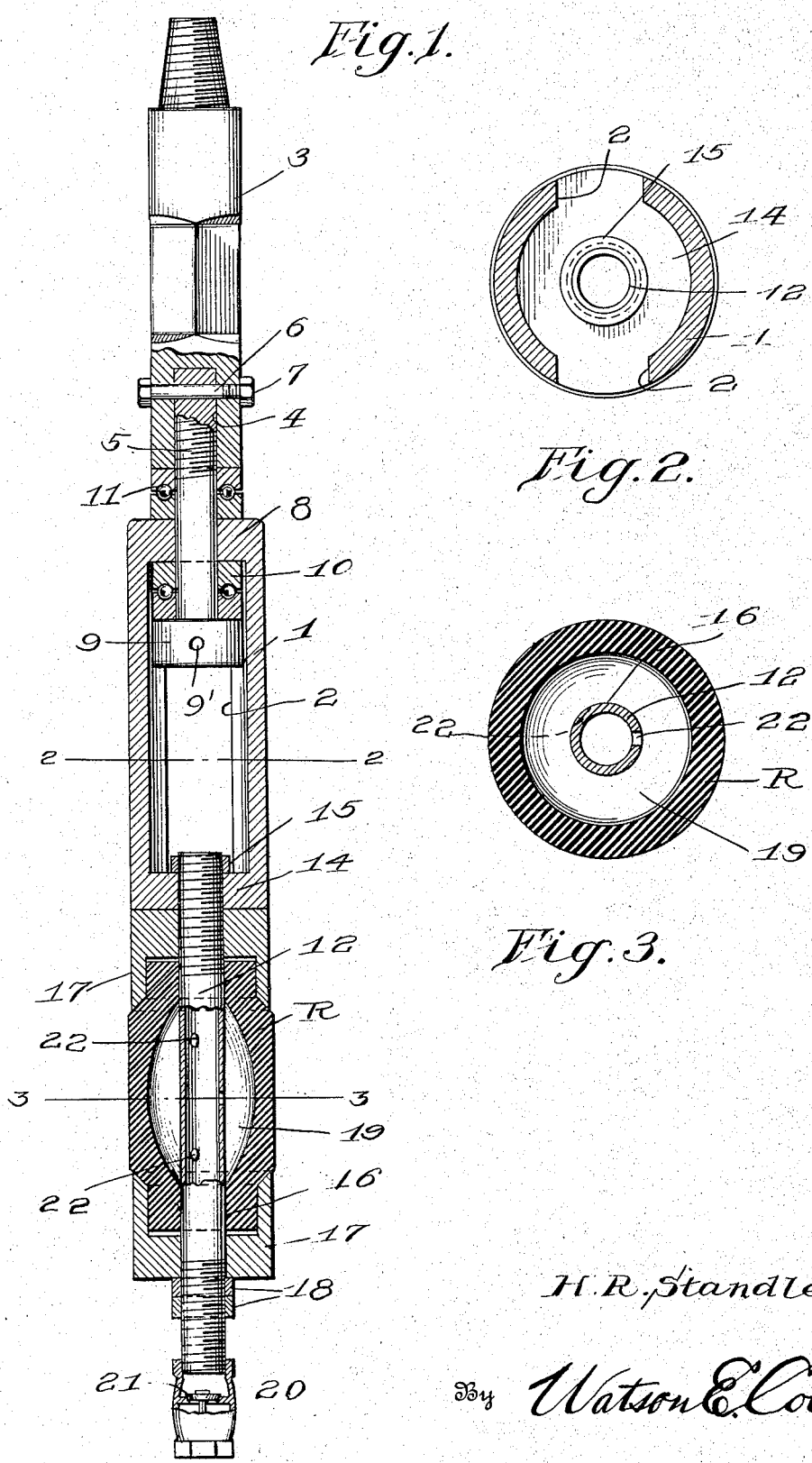
Inventor
H. R. Standlee
By Watson E. Coleman
Attorney

UNITED STATES PATENT OFFICE.

HARVEY R. STANDLEE, OF MEXIA, TEXAS.

SWAB.

Application filed August 17, 1922. Serial No. 582,500.

*To all whom it may concern:*

Be it known that I, HARVEY R. STAND-LEE, a citizen of the United States, residing at Mexia, in the county of Limestone and State of Texas, have invented certain new and useful Improvements in Swabs, of which the following is a specification, reference being had to the accompanying drawings.

This invention relates to certain improvements in swabs and has relation more particularly to a device of this general character especially designed and adapted for use in connection with deep wells and it is an object of the invention to provide a novel and improved device of this general character embodying means whereby the same may be coupled with the cable or swabbing line in a manner to permit the cable or line to twist and especially when the swab is being lowered.

Another object of the invention is to provide a novel and improved device of this general character whereby the mandrel of the swab may be readily and effectively secured to the cage and wherein the cage is provided with means to assure a flow therethrough with the possibility of clogging substantially eliminated.

Furthermore, it is an object of the invention to provide a novel and improved device of this general character embodying a rubber having its intermediate portion provided with an enlarged bore of a configuration to readily permit the rubber to adjust itself in so far as the outside diameter thereof is concerned and particularly to allow the rubber to contract in diameter when forced through a tight place in a casing so that the rubber will not be injured from friction.

It is also an object of the invention to provide a novel and improved device of this general character embodying a rubber having associated with the opposite end portions thereof rings to protect the extremities of the rubber and at the same time hold said rubber rigidly in its proper position.

A still further object of the invention is to provide a novel and improved device of this general character embodying a rubber having associated therewith means for maintaining the outside surface of the rubber in close contact with the inner surface of the casing to effectively prevent oil or the like leaking back around the outside surface of the rubber.

The invention consists in the details of construction and in the combination and arrangement of the several parts of my improved swab whereby certain important advantages are attained and the device rendered simpler, less expensive and otherwise more convenient and advantageous for use, as will hereinafter be more fully set forth.

The novel features of my invention will hereinafter be definitely claimed.

In order that my invention may be the better understood, I will now proceed to describe the same with reference to the accompanying drawings, wherein:

Figure 1 is a view partly in section and partly in elevation illustrating a swab constructed in accordance with an embodiment of my invention;

Figure 2 is a sectional view taken substantially on the line 2—2 of Figure 1; and Figure 3 is a sectional view taken substantially on the line 3—3 of Figure 1.

As disclosed in the accompanying drawings, 1 denotes a cage of my improved swab which is of desired dimensions. The wall of the cage at diametrically opposed points is provided with diametrically opposed slots 2 of a material width, the advantages of which will be hereinafter explained.

The upper connection or sub 3 is adapted to have secured thereto in a conventional manner a cable or swab line and the lower end portion of the upper connection or sub is provided at its axial center with a threaded socket 4 which receives an end portion of an elongated pin 5, said pin 5 being locked to the connection or sub through the medium of the bolt 6 which is disposed transversely through the connection or sub 3 and through the inserted end portion of the pin 5. Associated with the bolt 6 is a clamping nut 7 operating in a well known manner.

The pin 5 is freely directed through the outer end or head 8 of the cage and the end portion of said pin 5 within the cage is provided with an enlargement or head 9. The pin 5 provides means whereby the connection or sub 3 is swiveled to the cage 1 so that the twisting action of the cable or swab line is permitted to occur without resistance or hinderance being offered by the swab proper and particularly when the swab is being lowered or dropped within a well casing.

Interposed between the enlargement or head 9 of the rod 5 and the outer end or head 8 of the cage 1 is an anti-friction medium generally indicated as 10 and interposed between the outer end or head 8 of the cage 1 and the adjacent or lower end of the connection or sub 3 is the anti-friction medium generally indicated as 11. This construction assures the desired rotation of the connection or sub 3 and particularly as occasioned by the twisting of a cable or line with a minimum of frictional resistance.

12 denotes a mandrel of desired dimensions and which has one end portion threaded through the lower end or head 14 of the cage 1 and associated with the end portion of said mandrel 12 extending within the cage is a lock nut 15. The use of the lock nut 15 is of decided advantage as it assures the maintenance of the mandrel 12 against displacement with respect to the cage 1. The use of this lock nut 15 is made possible in view of the fact that the slots 2 are relatively wide or broad and of a width greater than the width of the nut 15.

R denotes a rubber of requisite dimensions and which is provided with an axial bore 16 through which the mandrel 12 is directed. The opposite end portions of the rubber R are reduced to provide the extensions which are received within the sleeve rings 17. These rings 17 afford protection for the end portions of the rubber R in addition to holding said rubber R more rigidly in applied position after the rubber has been properly applied upon the mandrel with the extensions thereof properly engaged within the sleeve rings 17. The rubber is rigidly and effectively maintained in its applied position through the instrumentality of the lock nuts 18 threaded upon the mandrel 12 coacting with the adjacent sleeve ring 17.

The intermediate portion 19 of the bore 16 of the rubber R is enlarged with its surface concave, said enlarged portion 19 being of a length equal to the distance between the extensions so that the intermediate portion of the rubber R is free of or out of contact with the mandrel 12. By this construction of the rubber R the rubber readily adjusts itself in so far as the outside diameter thereof is concerned and is of particular advantage should the swab be forced through a tight place in the well casing as the large portion 19 of the bore of the rubber R will readily permit the rubber R to contract and thereby not be injured from friction.

The lower or outer end of the mandrel 12 has engaged therewith a valve casing 20 in which operates an inwardly opening check valve 21 so that when the swab is lowered within the casing the oil or the like will pass upwardly through the mandrel 12 into the cage 1 and out through the slots 2. By having the slots 2 materially wide or broad particles of rubber torn from the rubber R or other particles falling in the oil and passing up through the mandrel can readily escape through the slots 2 without clogging the same. This is of particular advantage because with the use of swabs having relatively small openings in the cage such particles are liable to stop or clog such openings, resulting in the gas pressure created blowing the entire tools out of the well as has been known to occur. That portion of the mandrel 12 disposed through the enlarged portion 19 of the bore 16 of the rubber is provided with relatively small openings 22 which permit the pressure of the oil or the like above the swab to enter the portion 19 through the openings 22 and thereby forcing outwardly the working surface of the rubber R and maintaining the same in close contact with the inner surface of the well casing and thereby effectively preventing any oil or the like leaking back around the rubber R. In this connection particular attention is directed to the fact that the concavity of the bore of the rubber R is greatest at the central portion of the main body of the rubber and for this reason this central portion is weakest and most easily expanded. Accordingly, when pressure is applied to the rubber during the swabbing operation this pressure will cause the outer surface of the rubber to bow, the central portion thereof being the furthest expanded and being the portion which most strongly contacts the casing. This feature of the construction is important in that the rubber being highly flexible and weakest at this point readily gives to pass over an obstruction, thus preventing tearing and gouging of the rubber to the extent commonly met with in the operation of swabs. Even though the periphery of the rubber R be gashed by an obstruction in the well, this central portion being reduced in strength is very readily expanded to engage against the wall and compensate for inequalities of the surface formed by such abrasion.

The enlargement or head 9 of the pin or rod 5 has disposed radially therethrough an opening 9'. A bolt or kindred element is adapted to be inserted through this opening 9' when it is desired to disconnect the upper connection or sub 3 from the cage 1, said bolt or the like to be of a length to have requisite contact with the cage 1 to hold the pin or rod 5 stationary while the upper connection or sub 3 is being engaged with or disconnected from the pin or rod 5.

From the foregoing description it is thought to be obvious that a swab constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In a swab, the combination with a tubular mandrel, a cage engaged with an end portion of the mandrel and with which said mandrel communicates, a rubber surrounding the mandrel below the cage, said rubber having inclined portions terminating in reduced cylindrical extended end portions, sleeve rings mounted upon the mandrel above and below the rubber and having inclined portions, the reduced end portions of the rubber being received within the sleeve rings and the inclined portions of the rubber engaging the inclined portions of the rings, means carried by the mandrel and coacting with the sleeve rings for clamping the rubber at a fixed position upon the mandrel, said rubber having the bore thereof concavely enlarged to provide a space about the mandrel, said concaved portion being substantially coextensive with the exposed outer wall of the rubber, the concavity of said bore being greatest at the central portion of the main body of the rubber, the mandrel having perforations communicating with the concavity of the bore of the rubber.

In testimony whereof I hereunto affix my signature.

HARVEY R. STANDLEE.